UNITED STATES PATENT OFFICE.

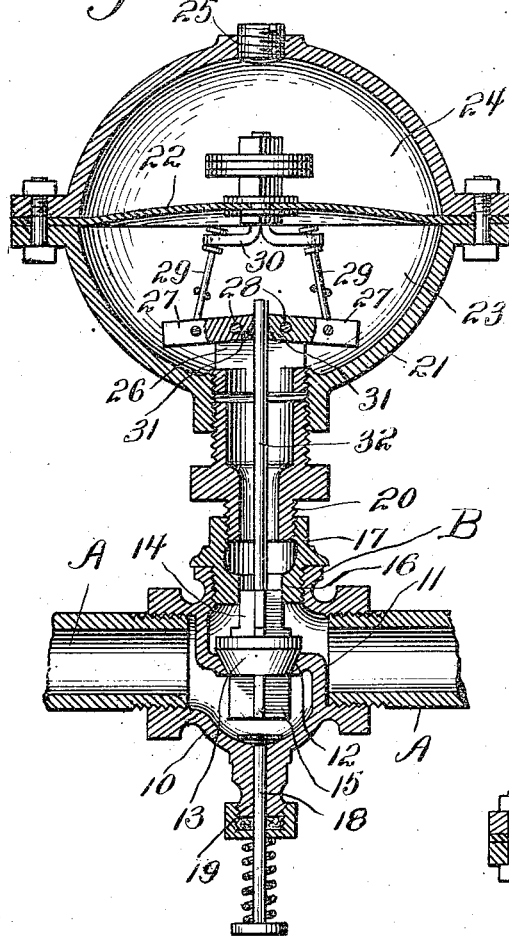
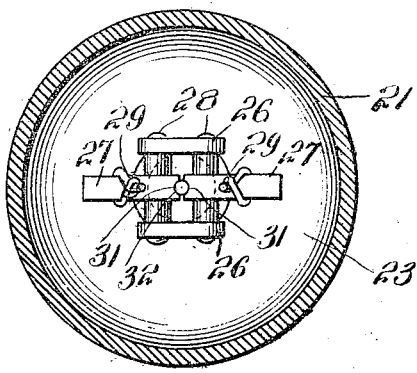
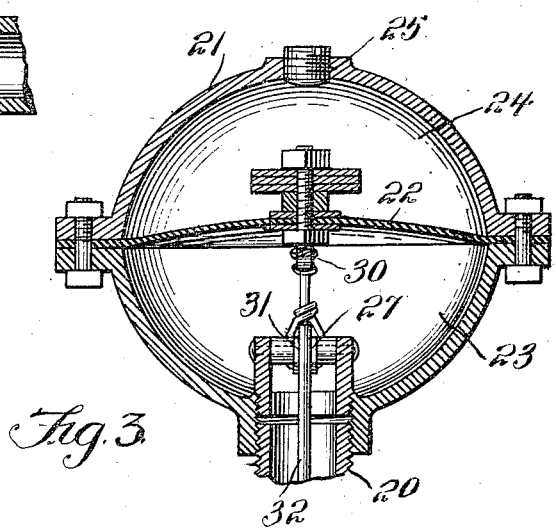

ARTHUR ABSALOM AND WADE H. COLEY, OF MONTGOMERY, WEST VIRGINIA.

VALVE.

1,160,118.

Specification of Letters Patent.   Patented Nov. 16, 1915.

Application filed May 25, 1915. Serial No. 30,420.

*To all whom it may concern:*

Be it known that we, ARTHUR ABSALOM and WADE H. COLEY, citizens of the United States, residing at Montgomery, in the county of Fayette and State of West Virginia, have invented new and useful Improvements in Valves, of which the following is a specification.

The invention relates to cut-off valves, and more particularly to the class of automatic cut-off safety valves.

The primary object of the invention is the provision of a valve structure of this character wherein, when the main for supplying the gas to the service pipe has been once cut off, it necessitates the manual opening of the valve before the supply can be had at the points of consumption from the service pipe, and the instant the gas pressure is cut off in the main the valve automatically closes so as to avoid any possibility of the escape of gas from the points of consumption when the main is again turned on.

Another object of the invention is the provision of a valve of this character wherein the construction thereof is novel in form to assure perfect safety and the automatic operation thereof, so as to eliminate any possibility of asphyxiation or explosion resulting from inadvertence in leaving the service pipe open at the points of consumption of the gas.

A still further object of the invention is the provision of a valve of this character which is extremely simple in construction, reliable and efficient in operation, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawings:—Figure 1 is an enlarged vertical sectional view through a valve constructed in accordance with the invention. Fig. 2 is a horizontal transverse sectional view through the pressure chamber in the diaphragm shell or casing. Fig. 3 is a fragmentary vertical sectional view at right angles to the section shown in Fig. 1 of the drawings.

Similar reference characters indicate corresponding parts throughout the several view in the drawings.

Referring to the drawings in detail, A designates a gas service pipe, which as usual constitutes the house or interior system for the consumption of gas for lighting, heating, or the like, and is supplied with the gas from a main in the ordinary well-known manner, while connected to the service pipe between the points of consumption and a meter is the automatic cut-off safety valve structure B hereinafter fully described.

The valve structure B comprises a valve casing 10 communicating at both sides with the service pipe A, and is formed therein with a partition 11 provided with a valve seat 12, as usual, in which is adapted to engage a valve 13 having the respective top and bottom guide wings 14 and 15. The said top wing works within a central bore 16 formed in a cap 17, while adapted to work against the bottom wings 15 is a spring-tensioned hand-controlled plunger 18 adapted to unseat the valve 13, and working through a stuffing box or gland 19 located centrally and at the bottom of the valve casing.

Tapped in the cap 17 on the valve casing 10 is a coupling nipple 20 which has also engaged therewith a diaphragm shell or casing 21 which has fixed therein a flexible diaphragm 22 dividing the shell or casing into a pressure chamber 23 and an air chamber 24, respectively, the latter being adapted for communication with the atmosphere through a suitable port formed in the upper portion of the shell or casing 21 and this port is normally closed by means of a screw 25, while communication between the pressure chamber 23 and the valve casing 10 is had through the nipple so that when the valve 13 is seated and the supply of gas from the main is turned on it will flow into the pressure chamber 23 for the lifting of the diaphragm 22 for a purpose presently described.

Within the pressure chamber 23 and engaged in the nipple 20 are spaced parallel bearings 26 between which are arranged gripping jaws 27 supported upon the pivots 28 which are mounted in the said bearings, and near the outer ends of these jaws are connected links 29, the same being connected with a fork hanger 30 secured centrally in the diaphragm 22, the inner ends of the gripping jaws being formed with notched gripping surfaces 31, and between the gripping ends of these jaws is passed a valve stem 32 which is connected in the top wings 14 of the valve 13 so that on the lifting of the diaphragm 22 under gas pressure within the pressure chamber 23 the jaws 27 will be moved into positive locking engagement with the valve stem 32, thereby holding the valve 13 positively closed by engaging the seat 12 for shutting off the flow of gas through the service pipe A from the inlet to the outlet sides thereof, or to the points of consumption of the gas. In other words, the valve 13 is normally held seated by gravity and also by the presence of pressure playing against the top of the said valve. Now, when the pressure plays against the diaphragm it causes the jaws 27 to lock with the stem 32, thus positively holding the valve closed. When it is desired to permit the flow of gas through the service pipe A the plunger 8 is manually lifted against the resistance of its spring, which forces the valve 13 away from its seat, and at this instance the pressure of the gas upon the diaphragm 22 acts thereon to still maintain the jaws in gripping position, thereby holding the valve in positive open position so that the free flow of gas may be had through the service pipe. In event that the gas pressure is cut off from the main, thereby shutting it off from the service pipe, the diaphragm 22 is lowered by the reduction of gas pressure, thus releasing the jaws 27 from gripping engagement with the stem 32, and by the weight of the valve 13 it automatically lowers for engagement in the seat 12, thereby shutting off the gas supply through the main when the same is again turned on to the service pipe.

From the foregoing description, taken in connection with the accompanying drawings, the construction and manner of operation of the device will be clearly understood, and therefore a more extended explanation has been omitted.

What is claimed is:

1. The combination with a valve casing and a valve therein, a cap engaged in the valve casing, a coupling nipple threaded in the cap, a diaphragm shell mounted upon the nipple, a flexible diaphragm within the shell and dividing the same into pressure and air chambers, a valve stem on the valve and extended through the cap and nipple to protrude within the pressure chamber in the shell, gripping jaws pivotally supported within the pressure chamber and located opposite each other, a forked hanger mounted centrally in the diaphragm, and links pivotally connected to the gripping jaws and also to the respective limbs of the fork to actuate the gripping jaws for gripping the valve stem on pressure being exerted against the flexible diaphragm.

2. The combination with a valve casing and a valve therein, a cap engaged in the valve casing, a coupling nipple threaded in the cap, a diaphragm shell mounted upon the nipple, a flexible diaphragm within the shell and dividing the same into pressure and air chambers, a valve stem on the valve and extended through the cap and nipple to protrude within the pressure chamber in the shell, gripping jaws pivotally supported within the pressure chamber and located opposite each other, a forked hanger mounted centrally in the diaphragm, links pivotally connected to the gripping jaws and also to the respective limbs of the fork to actuate the gripping jaws for gripping the valve stem on pressure being exerted against the flexible diaphragm, and guide wings on the valve and engageable in the cap to permit the passage of pressure therethrough to the pressure chamber within the diaphragm shell.

In testimony whereof I affix my signature in presence of two witnesses.

ARTHUR ABSALOM.
WADE H. COLEY.

Witnesses:
R. M. HOLSTINE,
E. PERCIVAL.

Copies of this patent may be obtained for five cents each, by addressing the "Commissioner of Patents, Washington, D. C."